(12) United States Patent
Johansson et al.

(10) Patent No.: US 10,552,238 B2
(45) Date of Patent: Feb. 4, 2020

(54) SECURE INTER-PROCESS COMMUNICATIONS FOR MOBILE DEVICES

(71) Applicant: Amazon Technologies, Inc., Seattle, WA (US)

(72) Inventors: Jesper Mikael Johansson, Redmond, WA (US); Heidi Lynn Daigler, Redmond, WA (US); Andrew Jay Roths, Kenmore, WA (US)

(73) Assignee: Amazon Technologies, Inc., Seattle, WA (US)

( * ) Notice: Subject to any disclaimer, the term of this patent is extended or adjusted under 35 U.S.C. 154(b) by 31 days.

(21) Appl. No.: 15/495,640

(22) Filed: Apr. 24, 2017

(65) Prior Publication Data

US 2017/0228266 A1    Aug. 10, 2017

Related U.S. Application Data

(63) Continuation of application No. 14/625,410, filed on Feb. 18, 2015, now Pat. No. 9,632,851.

(51) Int. Cl.
| | |
|---|---|
| *G06F 9/54* | (2006.01) |
| *G06F 21/60* | (2013.01) |
| *G06F 21/53* | (2013.01) |
| *G06F 3/0482* | (2013.01) |
| *G06F 21/62* | (2013.01) |

(52) U.S. Cl.
CPC ............ *G06F 9/543* (2013.01); *G06F 3/0482* (2013.01); *G06F 21/53* (2013.01); *G06F 21/606* (2013.01); *G06F 21/6218* (2013.01); *G06F 2221/033* (2013.01)

(58) Field of Classification Search
None
See application file for complete search history.

(56) References Cited

U.S. PATENT DOCUMENTS

| | | | |
|---|---|---|---|
| 5,206,951 | A | 4/1993 | Khoyi et al. |
| 5,535,332 | A | 7/1996 | Ishida |
| 2003/0101200 | A1* | 5/2003 | Koyama ........... G06F 17/30194 |
| 2005/0243721 | A1 | 11/2005 | Cai et al. |
| 2006/0106772 | A1 | 5/2006 | Donovan et al. |
| 2014/0029751 | A1 | 1/2014 | Swineford et al. |

(Continued)

OTHER PUBLICATIONS

International Organization for Standardization/ International Electrotechnical Commission, "Information technology—Trusted Platform Module—Part 1: Overview," International Standard, ISO/IEC 11889-1(E), May 15, 2009, 20 pages.

(Continued)

*Primary Examiner* — Craig C Dorais
(74) *Attorney, Agent, or Firm* — Davis Wright Tremaine LLP

(57) ABSTRACT

An application may provide an export file type definition indicating data objects that may be shared with another application. Sharing data objects between applications may include obtaining the export file type definition from the application and displaying a graphical user interface based at least in part on the export file type definition. Data objects may be selected through the graphical user interface and provided to another application based at least in part on the selection.

20 Claims, 11 Drawing Sheets

(56) References Cited

U.S. PATENT DOCUMENTS

2015/0169391 A1* 6/2015 Asai .................. H04N 1/00
                                                                719/313
2016/0092107 A1* 3/2016 Bruner .................. G06F 3/061
                                                                711/102

OTHER PUBLICATIONS

International Organization for Standardization/International Electrotechnical Commission, "Information technology—Trusted Platform Module—Part 2: Design principles," International Standard, ISO/IEC 11889-2(E), May 15, 2009, 152 pages.

International Organization for Standardization/International Electrotechnical Commission, "Information technology—Trusted Platform Module—Part 3: Structures," International Standard, ISO/IEC 11889-3:2009(E), 204 pages.

International Organization for Standardization/International Electrotechnical Commission, "Information technology—Trusted Platform Module—Part 4: Commands," International Standard, ISO/IEC 11889-4:2009(E), 254 pages.

TCG Published, "TPM Main Part 3 Commands," Specification Version 1.2, Level 2 Revision 116, Mar. 1, 2011, 339 pages.

Trusted Computing Group, "TPM Main, Part 1 Design Principles," Specification Version 1.2, Level 2 Revision 103, Jul. 9, 2007, 182 pages.

Trusted Computing Group, "TPM Main, Part 1 Design Principles," Specification Version 1.2, Revision 116, Mar. 1, 2011, 184 pages.

Trusted Computing Group, "TPM Main, Part 2 TPM Structures," Specification Version 1.2, Level 2 Revision 103, Jul. 9, 2007, 198 pages.

Trusted Computing Group, "TPM Main, Part 2 TPM Structures," Specification Version 1.2, Revision 116, Mar. 1, 2011, 201 pages.

Trusted Computing Group, "TPM Main, Part 3 Commands," Specification Version 1.2, Level 2 Revision 103, Jul. 9, 2007, 330 pages.

* cited by examiner

SECURE INTER-PROCESS COMMUNICATIONS FOR MOBILE DEVICES

CROSS REFERENCE TO RELATED APPLICATION

This application is a continuation of U.S. patent application Ser. No. 14/625,410, filed Feb. 18, 2015, entitled "SECURE INTER-PROCESS COMMUNICATIONS FOR MOBILE DEVICES," the disclosure of which is hereby incorporated herein in its entirety.

BACKGROUND

Various computing devices are configured to isolate applications from one another. The isolation prevents an application from obtaining and/or accessing the state of another application executed on the computing device. This type of application and/or process isolation is referred to as "sandboxing" which prevents any application gaining access to any other application's stored state. The security provided by sandboxing applications may prevent application state information from being compromised if an application of the computing device is compromised. However, sandboxing applications may make the process of sharing applications state between applications considerably more difficult. For example, to e-mail a document, a user may be required to generate and/or load the document into a word processing application, then generate an e-mail in an e-mail application, and then send it. As a result, the user may not be able to attach the document in a reply to an existing e-mail.

Software developers use a variety of techniques to work around sandboxing of applications. For instance, depending on the device, the application may place data objects in a memory of the computing device in a location which may be accessible to any application implemented by the computing device (even if the user does not want the data object to be accessible to a particular application). These mechanisms may at least partially compromise the sandboxing placed on applications of the computing device. As described above, data objects may become accessible to all applications implemented on the device. Furthermore, executable code on an application may need to be configured to accept data objects from other specific applications. Ineffectively providing a mechanism to share application state between applications may expose sensitive information without restrictions, and requires the user to go through a cumbersome process of ensuring that data objects are stored in the shared directories.

BRIEF DESCRIPTION OF THE DRAWINGS

Various embodiments in accordance with the present disclosure will be described with reference to the drawings, in which.

DETAILED DESCRIPTION

Figure 1:
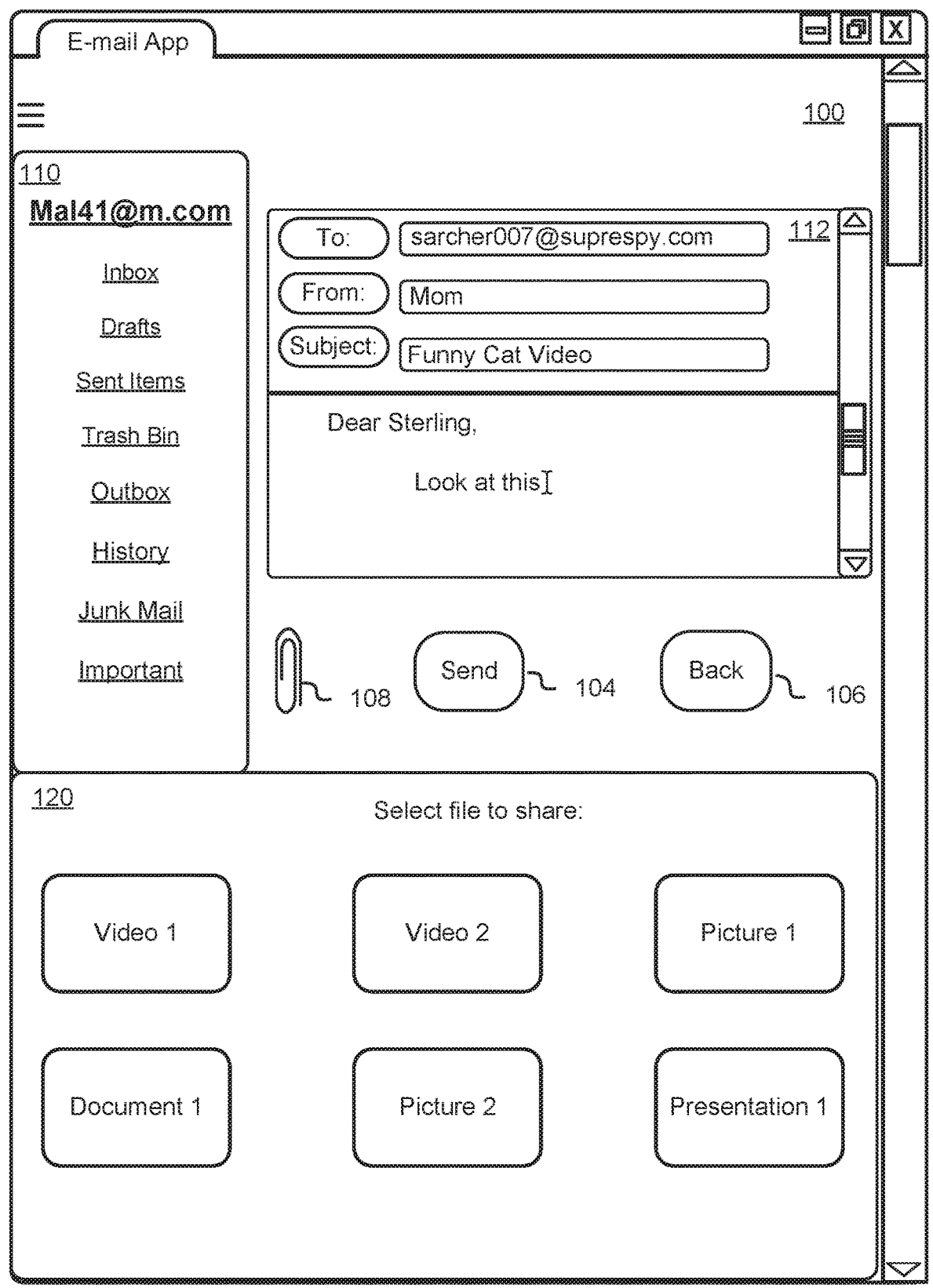
FIG. 1 is an illustrative example of sharing a data object between applications of a mobile computing device using secure inter-process communications in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to sharing data objects between applications of a computing device, where the applications are isolated from one another such that the applications are prevented from accessing application state information of other applications. The mobile device may be configured to enable applications to share data objects through a secure inter-process communications mechanism. For example a user may open an e-mail application and create a new e-mail message and select an "attach file" option presented to the user in the e-mail application. The e-mail application may then, through an operating system of the mobile device, poll the applications of the mobile device for a set of export file type definitions. The set of export file type definitions may be stored in a memory of the mobile device and may be accessible to the application of the mobile device. The e-mail application may then parse the set of export file type definitions to determine a set of data objects that may be attached to the new e-mail message. The various applications of the mobile device may be responsible for generating an export file type definition for each file type or data type the application may be configured to generate, obtain, and/or share.

The export file type definitions may define a method for exporting data objects of the indicated type from the application. Furthermore, the export file type definition may define various formats or other file types that data objects of the application may be converted into. The export file type definitions may also define user interface options, such as displaying thumbnails of the data object in a user interface displayed to the user and configured to enable the user to select data objects to share. The user may then select a type of data object, such as a document or picture, to export to the e-mail in a dialog or similar user interface element displayed to the user. The user interface element may be implemented by the application exporting the data object or may be generated by the operating system of the mobile device. The user may be able to select a particular data object and an export format of the particular data object to be provided to the e-mail application. The application associated with the particular data object may then create a package of the selected data object and store the generated package temporarily in shared memory of the mobile device and return a pointer to the package to the e-mail application. The e-mail application may then open the package, obtain the data object, and attach the data object to the new e-mail message. Once the user sends the new e-mail message, the operations system or the application may delete or otherwise remove the package from the shared memory.

In various embodiments, multiple data objects of the same or different export file type definitions may be bundled from multiple applications or a single application. For example, a spreadsheet document and a word processing document generated by different applications may be bundled into a single package for sharing with another application. The application may use the export file type definition for each data object included in the package and create a single package for all data objects selected by the user. The package may then be available to be exported, based at least in part on an export file type definition associated with the package, to any application configured to interact with the export file type definitions associated with the package. Applications may provide to the operating system data object types and/or file types the applications are capable of sharing by providing the operating system with export file type definitions. Then, when an application attempts to access a data object or other state information of another application, the application may request the set of export file type definitions maintained by the operating system.

In various embodiments, the operations system transmits requests at a set of applications registered with the operating system for export file type definitions provided by the application and any content made available by the application. The user may then be presented by the operating system with a list of applications in a user interface element configured to enable the user to choose from various applications that have content available to share with at least one other application. After receiving a selection of an application from the user, the user interface element may then display a set of data objects the selected application has made available for sharing. In various embodiments, the file handle of the selected data object is marshaled to the application the user wants the data object to be shared with, and once that application closes the file handle, the sharing is terminated automatically by the operating system.

FIG. 1 shows an illustrative example of an application 100 including a user interface comprising several user interface elements, configured to enable the application 100 to obtain shared state information from another application of a computing device described herein in accordance with various embodiments. As illustrated in FIG. 1, the application 100 includes various graphical user interface elements including a menu bar 110, an e-mail creation area 112, and a file selector 120. The various graphical user interface elements enable the user to perform a variety of functions and/or operations provided by the application 100. For example, the user may, through the menu bar 110, access an inbox of the application 100 or other links to one or more other data folders of the application 100. Folders may include various data containers configured to contain one or more data objects associated with the application 100.

The application 100 may be a mobile application, standalone application, operating system component, web browser, or other executable code executed by the computing device. As described above, the application 100 may contain various graphical user interface elements which may link to one or more other functions of the application 100 that contain additional content corresponding to features of the application 100. The features may include various operations, information, or data provided to the user. In this example, the links included in the menu bar 110 appear as textual words which enable the links to be selected using an appropriate input device such as a keyboard, mouse, touchscreen, or other input device.

In this example, the application 100 also includes a graphical user element configured as an e-mail creation area 112. The e-mail creation area 112 may be a graphical user interface element of the application 100 where the underlying code of the application 100 is configured such that input from an input device causes information corresponding to the input received from the input device and displayed in the e-mail creation area 112. For example, the user may generate an input using a keyboard connected to the computer system displaying application 100, and the input may be received by the application 100 executing the underlying code of the e-mail creation area 112 and displaying the input in the e-mail creation area 112. The text input area may enable the user to interact with and/or generate messages, such as e-mails, for use with the application 100. Although e-mails are used as an illustrative example, a variety of different message types are considered within the scope of the present disclosure such as Short Message Service (SMS), Multimedia Messaging Service (MMS), audio messages, video messages, or any other message capable of generation, and/or receipt by a computing device.

The application 100 may also include a graphical user element configured as a "send" button 104. The send button 104 may be a graphical user interface element of the application 100 where the underlying code of the application 100 is configured such that selection by an input device of the send button 104 causes information corresponding to an e-mail message or other message included in the e-mail creation area 112 to be transmitted to a recipient. In various embodiments, the application 100 may obtain from another application a data object or link to a data object to be included in the transmitted message, described in greater detail below. The application 100 also includes a graphical user element configured as a "back" button 106. The back button 106 may be a graphical user interface element of the application 100 where the underlying code of the application 100 is configured such that the selection by an input device of the back button 106 causes the user to be redirected to one or more previously navigated features of the application 100. The application 100 also includes a graphical user element configured as an attach button 108, illustrated in FIG. 1 as a paper clip. The attach button 108 may be a graphical user interface element of the application 100 where the underlying code of the application 100 is configured such that the selection by an input device of the attach button 108 causes the file selector 120 to be displayed. The file selector 120 may display a set of files that the user may attach to the message included in the e-mail creation field 112. As described above, the file selector 120 may enable the user to access shared state of any other application implemented by the computing device. In various embodiments described in greater detail below, the file selector 120 enables the user to select particular data objects associated with an application based at least in part on an export file type definition.

Figure 2:
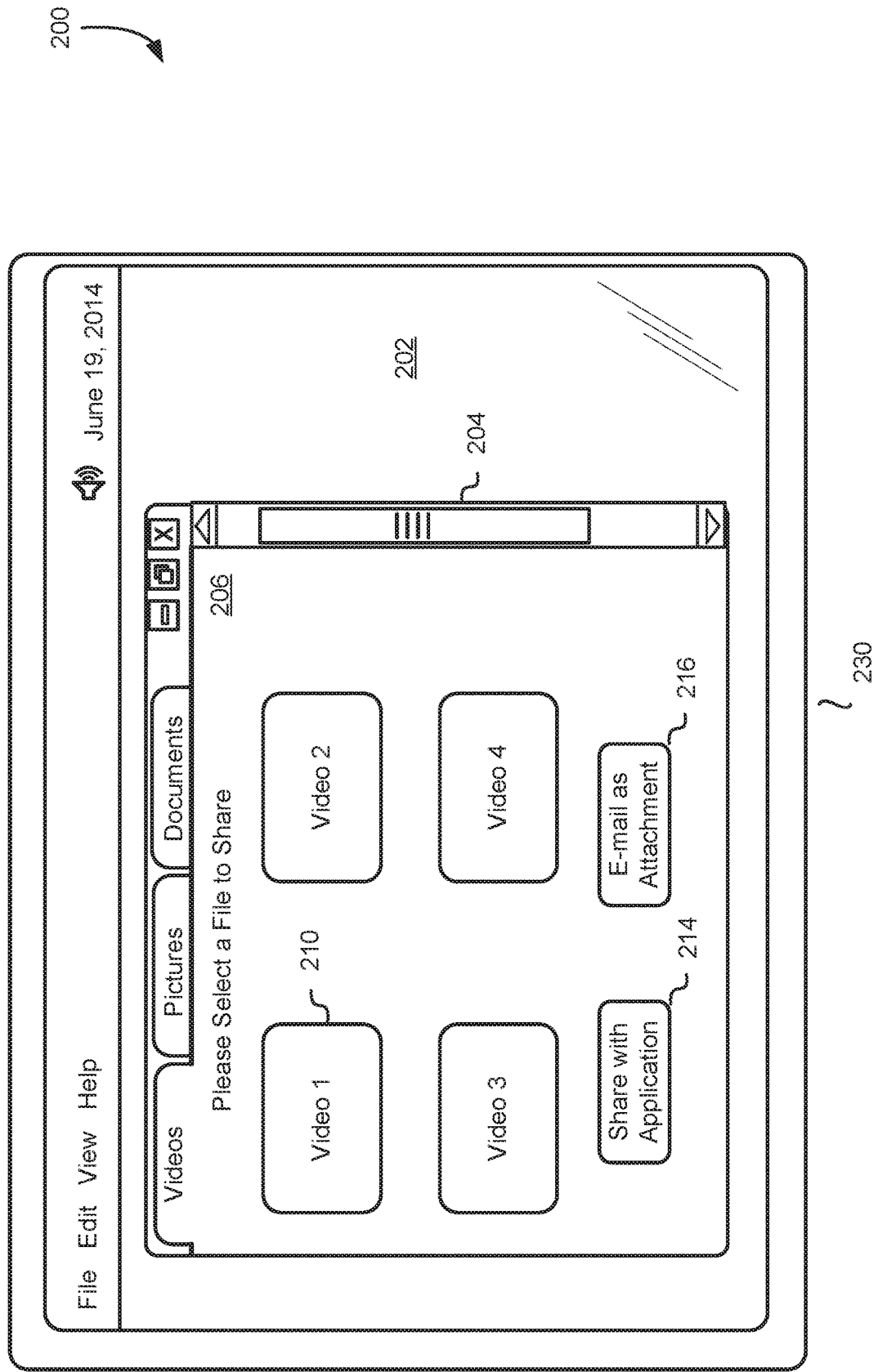
FIG. 2 is an illustrative example of sharing a data object between applications of a mobile computing device using secure inter-process communications in accordance with an embodiment.

FIG. 2 shows an illustrative example of an environment 200 in which a computing device 230 may display a user interface element 204 configured to enable a user to select data objects to share with at least one other application using a secure inter-process communications channel in accordance with an embodiment. In particular, FIG. 2 shows a display device 230, which displays a user interface 202. The display device may be, for example, a computer monitor of a notebook or personal computer, a display of a mobile device, a display of a tablet computing device, or otherwise a display of a computing device. In an embodiment, the user interface 202 is provided by an operating system of a computing device causing the user interface 202 to be displayed. In the particular example illustrated in FIG. 2, a display of the user interface element 204 is displayed on the user interface 202. The user interface element 204 may, for example, comprise a list 206 of data objects of various types that may be shared between applications implemented by the computing device. The user interface element 204 may be generated by the operating system and executed by a computing device enabling a user to interact with data objects. The list 206 may also include various other graphical user interface elements 210 that enable the selection of the various data objects displayed in the user interface element 204. For example, the various other graphical user interface elements 210 may include a thumbnail or other representation of a particular data object associated with the various other graphical user interface elements 210. Furthermore, as illustrated in FIG. 2, the list may display a subset of data objects selected from a set of data objects which may be shared with another application. The user may utilize a scroll bar or other graphical user interface element to view and/or select from other data objects of the set of data objects.

In this particular example, the user interface element 204 provides the user an ability to select between various data object types and/or file types as well as a particular data object of each data object type and/or file type. As illustrated in FIG. 2, the user may select from videos, pictures, or documents. The different data object types and/or file types may be defined in an export file type definition provided by an application of the computing device, as described above. As with all embodiments described herein, variations that utilize different file types or data object types, such as spreadsheets, compressed files, audio, or other data types are also considered as being within the scope of the present disclosure. In various embodiments, the various data object types and/or file types, including data objects that may be shared between applications, is maintained by the operating system of the computing device. For example, the operating system may, at various points, poll or otherwise request information from applications of the computing device corresponding to export file type definitions generated by the applications.

As illustrated by FIG. 2, the user may select from the different data object types and/or file types by switching between tabs of the user interface element 204. Furthermore, the user may select several operations to perform, utilizing the selected data objects. The user may be able to select particular operations using various graphical user interface elements, such as a graphical user element configured as a "share with application" button 214. The share with application button 214 may be a graphical user interface element of the user interface 204 where the underlying code of the application or operating system displaying the user interface element 204 is configured such that selection by an input device of the share with application button 214 causes information corresponding to the selected data objects to be provided to another application of the computing device. For example, the computing device or component thereof may determine a data format and/or file type the other application accepts based at least in part on an export file type definition provided by the other application. An application associated with the data object may then convert the data object to the determined format and store the converted data object in a shared memory location.

In various embodiments, the data object may be marshaled between applications.

For example, a state of the data object and a code base of the data object may be recorded such that when the marshalled object is unmarshalled, a copy of the data object is obtained. The data object may be serializable or remote to the computing device. In yet other embodiments, data objects may be serialized when shared between applications implemented by the computing device. For example, the current state of the data object may be converted into a byte stream such that the byte stream can be converted back into a copy of the data object. Furthermore, the byte stream may be transcoded based at least in part on the export file type definitions provided by a recipient application. For example, a video may be transcoded and streamed to a recipient application based at least in part on video formats accepted by the recipient application. As described in greater detail below, a computing resource service provider may maintain information corresponding to export file type definitions accepted by recipients and may convert data objects between data object types prior to providing the data object to the recipient. For example, a user may select an image in a Joint Photographic Experts Group (JPEG) format, the recipient application may, as indicated by the recipient application's export file type definitions, only accept Portable Document Format (PDF) format. The computing resource service provider may then convert the image from JPEG to PDF prior to providing the recipient application with access to the converted image. The recipient application may be implemented by the computing device operated by the user or another computing device.

The user interface element 204 may further include a graphical user element configured as an "e-mail as attachment" button 216. The e-mail as attachment button 216 may be a graphical user interface element of the user interface element 204 where the underlying code of the application or operating system displaying the user interface element 204 is configured such that selection by the input device of the e-mail as attachment button 216 causes the data object or link to the data object to be provided to an e-mail application. The e-mail application may then attach the data object or data object link to a new or existing e-mail message. In various embodiments, the e-mail application transmits the e-mail message, in response to a user command, including the link to the data object.

Figure 3:
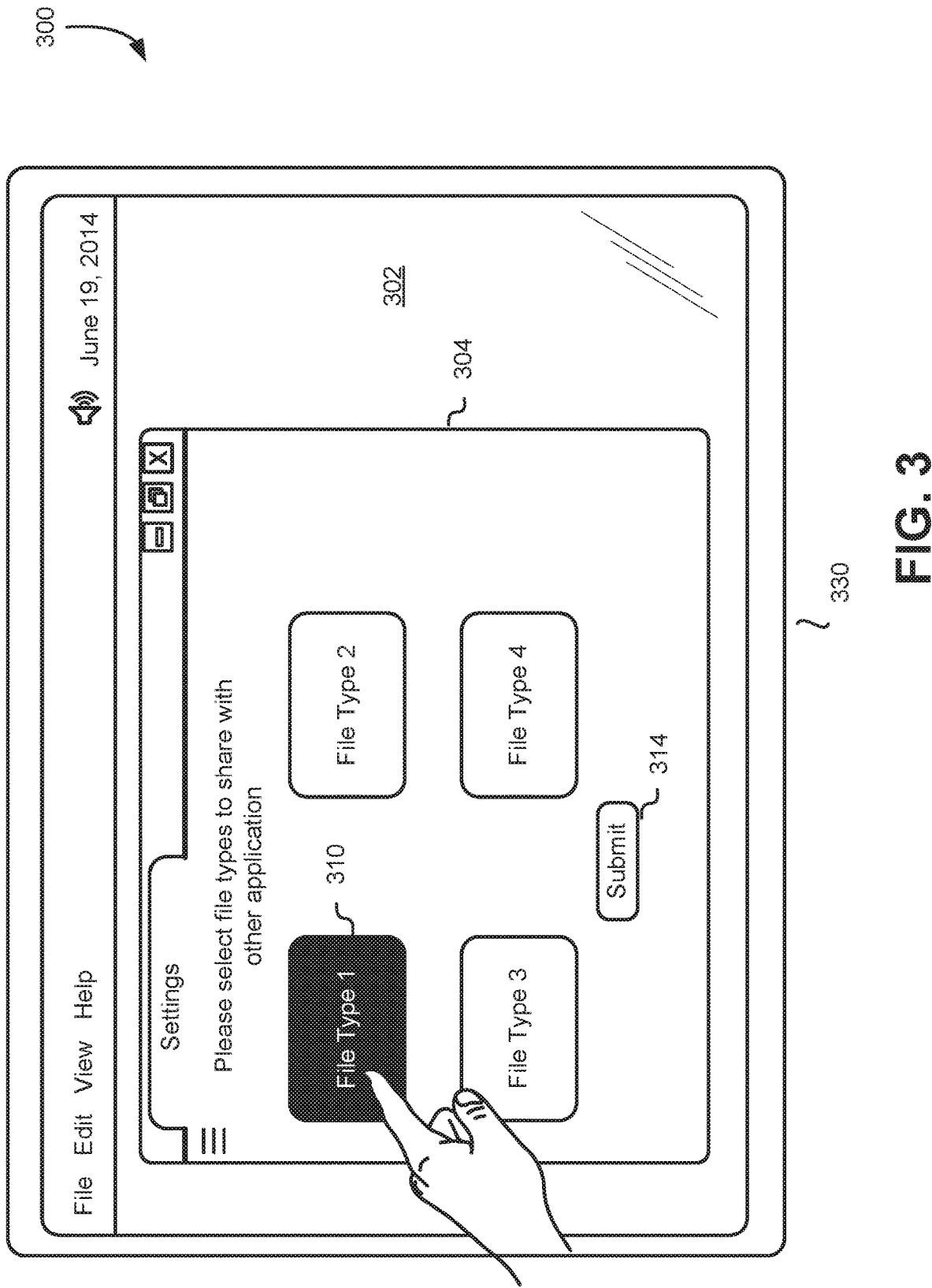
FIG. 3 is an illustrative example of selecting data type for sharing between applications of a mobile computing device using secure inter-process communications in accordance with an embodiment.

FIG. 3 shows an illustrative example of an environment 300 in which a computing device 330 may display a user interface element 304 configured to enable a user to select data types to share with at least one other application using a secure inter-process communications channel in accordance with an embodiment. In particular, FIG. 3 shows a display device 330, which displays a user interface 302. The display device may be, for example, a computer monitor of a notebook or personal computer, a display of a mobile device, a display of a tablet computing device, or otherwise a display of a computing device. In an embodiment, the user interface 302 is provided by an operating system of a computing device causing the user interface 302 to be displayed. In yet other embodiments, the user interface 302 or a portion thereof, such as user interface element 304, is provided by an application implemented by the computing device. In the particular example illustrated in FIG. 3, a display of the user interface element 304 is displayed on the user interface 302. The user interface element 304 may be, for example, "settings" user interface elements configured to enable the user to adjust file sharing options for an application.

The user may select particular data object types 310 to be enabled for sharing with at least one other application implemented by the computing device. For example, a photo application may be capable of generating pictures as well as videos, and the user may select to only enable the photo application to share pictures generated by the photo sharing application. In another example, the user may select particular data object for sharing with other applications, such as particular photos or videos from a set of all of the photos or videos captured using the photo application. Selection of a particular data object type 310 may cause the computing system or component thereof, such as an application associated with the data object type or the operating system of the computing device, to generate an export file type definition for the selected data object type. The export file type definition may indicate a data object type, an application capable of generating the data object type, an application capable of viewing the data object type, an application capable of editing the data object type, an application capable of transmitting the data object type, or other metadata associated with the data object type. Furthermore, the user interface element 304 may further include a graphical user element configured as a "submit" button 314. The submit button 314 may be a graphical user interface element of the user interface element 304 where the underlying code of the application or operating system displaying the user interface element 304 is configured such that selection by the input device of the submit button 314 causes the export file type definition to be generated and stored by the computing device. In various embodiments, selection of the submit button 314 causes the export file type definition to be provided to a computing resource service provider, described in greater detail below.

Figure 4:
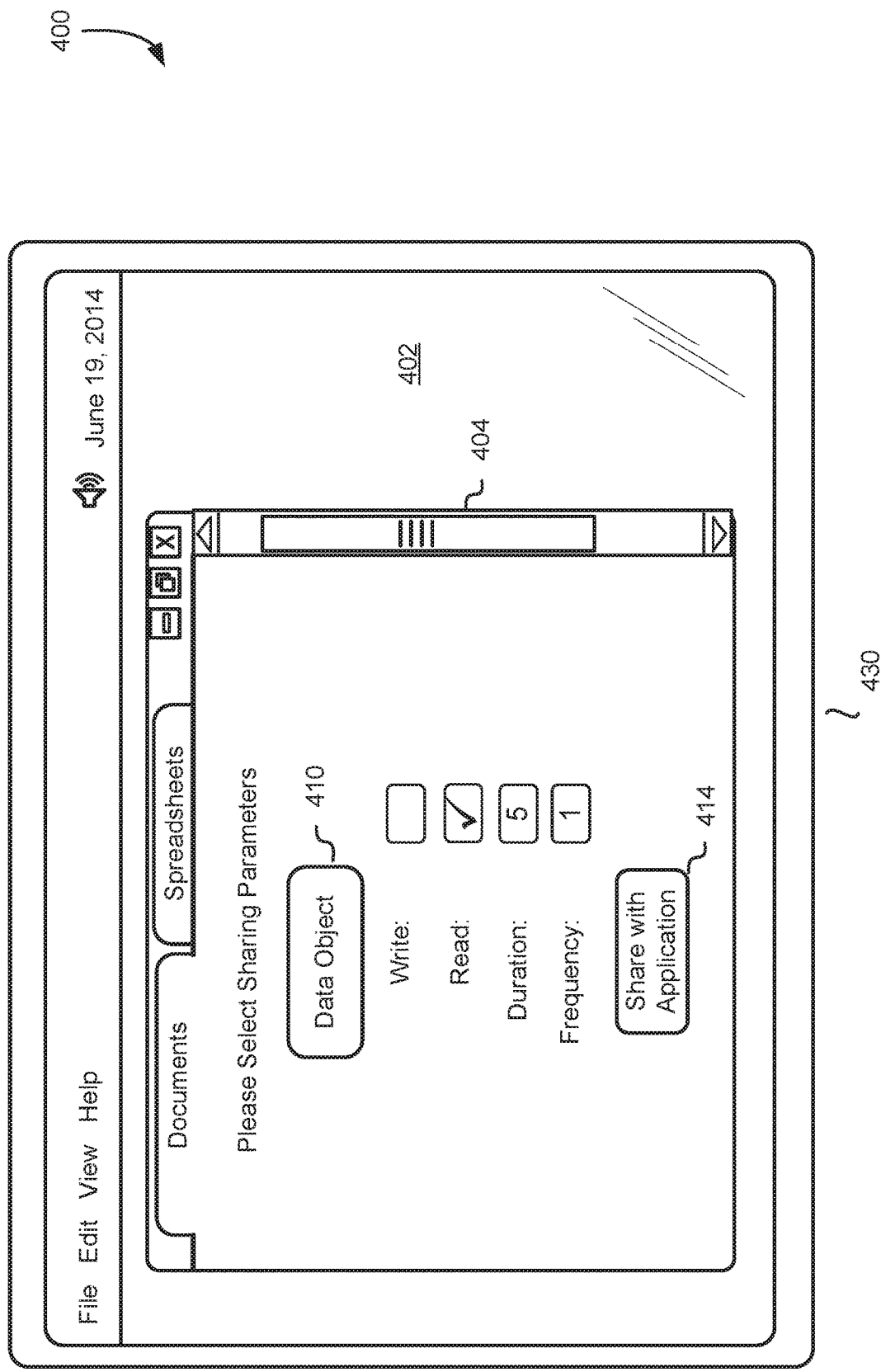
FIG. 4 is an illustrative example of selecting applications of a mobile computing device to share data objects using secure inter-process communications in accordance with an embodiment.

FIG. 4 shows an illustrative example of an environment 400 in which a computing device 430 may display a user interface element 404 configured to enable a user to provide various parameters associated with sharing selected data objects with at least one other application, capable of interacting with the selected data objects, using a secure inter-process communications channel in accordance with an embodiment. In particular, FIG. 4 shows a display device 430, which displays a user interface 402. The display device may be, for example, a computer monitor of a notebook or personal computer, a display of a mobile device, a display of a tablet computing device, or otherwise a display of a computing device. In an embodiment, the user interface 402 is provided by an operating system of a computing device causing the user interface 402 to be displayed. In yet other embodiments, the user interface 402 or a portion thereof such as user interface element 404 is provided by an application implemented by the computing device. In the particular example illustrated in FIG. 4, a display of the user interface element 404 is displayed on the user interface 402. The user interface element 404 may be configured to enable the user to select various sharing parameters for a data object 410, where the data object is of a particular data object type defined in an export file type definition as described above. The data object 410 may include a variety of different data objects, as described herein, including pictures, videos, documents, spreadsheets, presentations, e-mail, messages, source code, files, or any other data object capable of being shared between applications.

The user interface element 404 may be configured to enable the user to set one or more sharing parameters for data objects and/or a particular sharable data object. For example, the user interface element 404 may enable the user to set privileges for an application such as read or write access. The privileges may determine a set of interactions the application may perform with the data object 410. Furthermore, the user interface element 404 may enable the user to set other sharing parameters such as a duration or interval of time the application may access the data object 410 as well as a frequency or number of times the application may access the data object 410. For example, if the user is attaching the data object 410 to an e-mail, the user may want to limit the duration or number of times the e-mail application may have access to the data object. The operating system of the computing device may broker the exchange of information between applications and the application generating the user interface element 410. For example, the operating system of the computing device may maintain export file type definitions obtained from various applications of the computing device, and the application generating the user interface element 410 may request information from the operating system corresponding to a set of applications that support the data object type selected by the user. As illustrated by FIG. 4, the user may set various sharing parameters based at least in part on the set of applications that support the data object type. For example, if an e-mail application does not have the capability of editing a particular data object type, the user interface element 410 may not display the write sharing parameter.

Furthermore, the user interface element 404 may further include a graphical user element configured as a "share with application" button 414. The share with application button 414 may be a graphical user interface element of the user interface element 404 where the underlying code of the application or operating system displaying the user interface element 404 is configured such that selection by the input device of the share application button 414 causes an export file type definition and/or a link to a data object to be generated and stored by the computing device. The data object 410 may then be interacted with by the application and, in some embodiments, changes to the data object 410, as a result of the interaction by the application, may be persisted to the data object 410.

Figure 5:
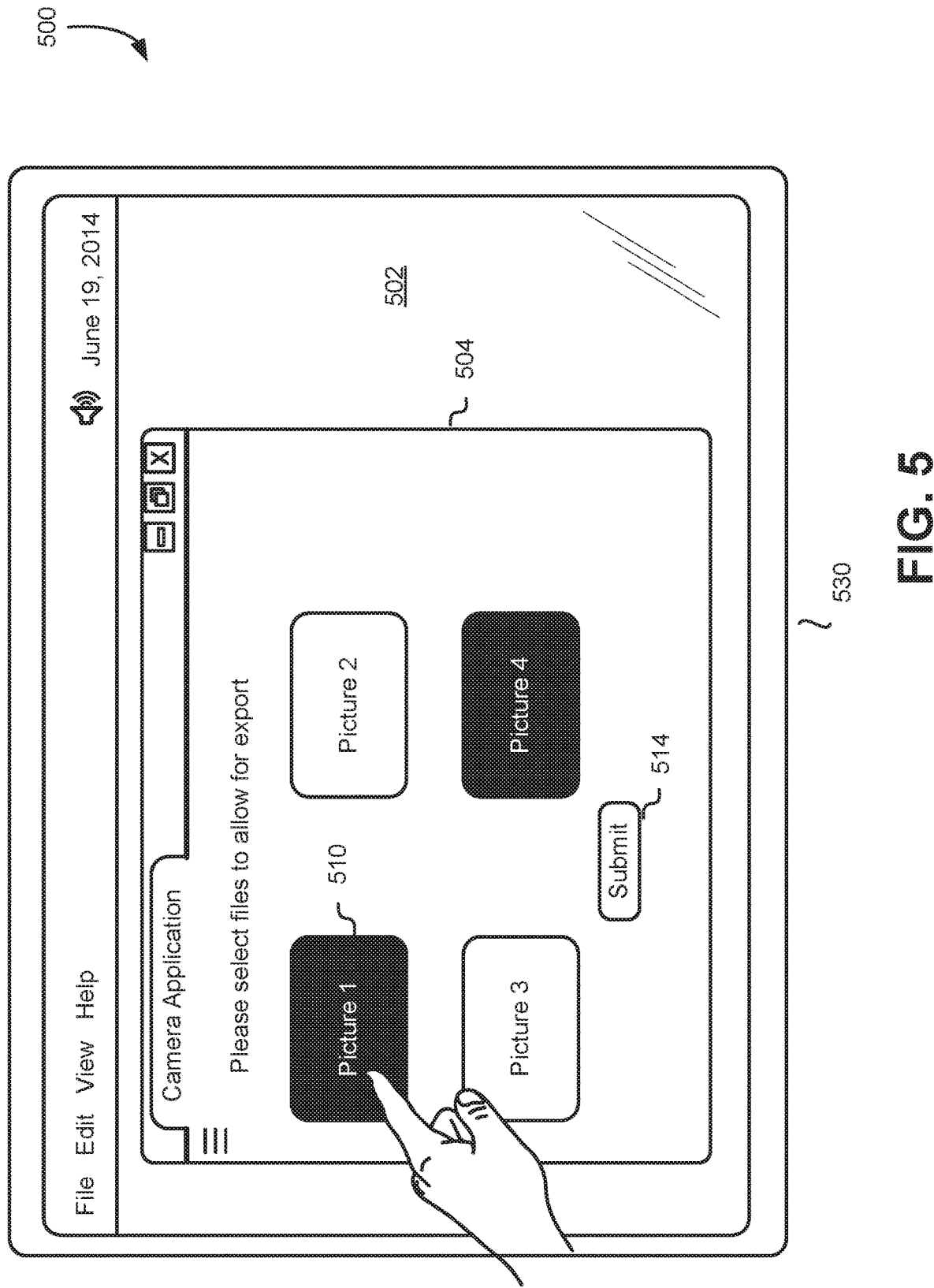
FIG. 5 is an illustrative example of selecting data objects for sharing between applications of a mobile computing device using secure inter-process communications in accordance with an embodiment.

FIG. 5 shows an illustrative example of an environment 500 in which a computing device 530 may display a user interface element 504 configured to enable a user to select data objects allowed to be shared with at least one other application using a secure inter-process communications channel in accordance with an embodiment. In particular, FIG. 5 shows a display device 530, which displays a user interface 502. The display device may be, for example, a computer monitor of a notebook or personal computer, a display of a mobile device, a display of a tablet computing device, or otherwise a display of a computing device. In an embodiment, the user interface 502 is provided by an operating system of a computing device causing the user interface 502 to be displayed. In yet other embodiments, the user interface 502 or a portion thereof, such as user interface element 504, is provided by an application implemented by the computing device. In the particular example illustrated in FIG. 5, a display of the user interface element 504 is displayed on the user interface 502. The user interface element 504 may be, for example, a file selector user interface element configured to enable the user to select particular files 510 of an application implemented by the computing device to enable for sharing with other applications implemented by the computing device.

The application may produce various different types of data objects of which the user may select to share with other applications. For example, a camera application may generate pictures and videos from which the user may select to share only a portion of the pictures and videos generated by the camera application. Additionally, the user interface element 504 may display the most recently generated data objects. Furthermore, the user interface element 504 may display data objects maintained in a remote storage device operated by a computing resource service provider as described in greater detail below. The operating system or other application may determine information to include in the user interface element 504 based at least in part on the user's interaction with at least one other application. For example, if the user generates a document or picture using a first application and then launches a messaging application the generated document or picture may be included in the user interface element and/or attached or otherwise included in a message of the messaging application.

Furthermore, the user interface element 504 may further include a graphical user element configured as a "submit" button 514. The submit button 514 may be a graphical user interface element of the user interface element 504 where the underlying code of the application or operating system displaying the user interface element 504 is configured such that selection by the input device of the submit button 514 causes an export file type definition of the selected data objects to be generated and stored by the computing device. The generated export file type definition may enable at least one other application to obtain access to the selected data objects.

Figure 6:
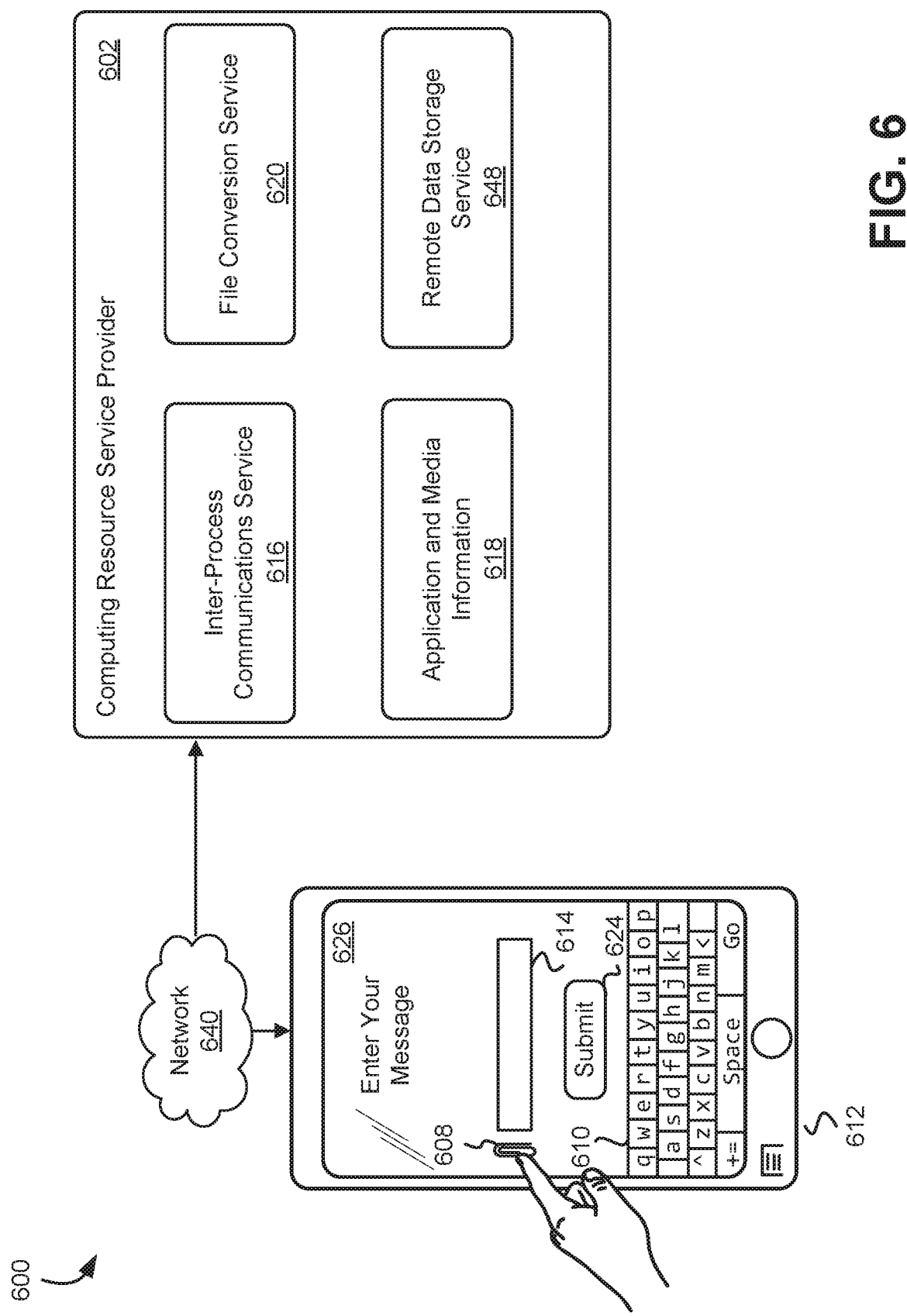
FIG. 6 illustrates an environment for sharing data objects between applications of a mobile device using computing resources of a computing resources service provider in accordance with an embodiment.

FIG. 6 illustrates an example environment 600 where a computing device 612 may communicate with a computing resource service provider 602 in order to facilitate secure inter-process communication in accordance with an embodiment. The computing resource service provider 602 may provide a variety of services to a user operating the computing device 612 and the computing device 612 may communicate with the computing resource service provider 602 via an interface (not shown in FIG. 6 for simplicity), which may be a web services interface or any other type of customer interface. The user may utilize the computing device 612 to access various data objects and provide various data objects to at least one other computing device. As illustrated in FIG. 6, a login screen may prevent unauthorized users from accessing restricted computing resources. The message screen 626 may be a user interface element utilized by an operating system or other applications implemented by the computer device 612. The message screen 626 may enable a user to generate a message, using certain button combinations, or by performing certain gestures using a touchscreen or other interface 610 of the computing device 612. In various embodiments, the message screen 626 of the computing device 612 may provide at least some functionality beyond enabling the user to generate a message. For example, the message screen 626 may enable the user to attach data objects 614 to the message by at least selecting an attach button 608.

The user utilizing the computing device 612 may connect to the computing resource service provider 602, via a network 640. The network 640 includes, for example, the Internet, intranets, extranets, wide area networks (WANs), local area networks (LANs), wired networks, wireless networks, or other suitable networks, or any combination of two or more such networks. The computing resource service provider 602 may provide various computing resource services to the user. The services provided by the computing resource service provider 602, in this example, include an inter-process communication service 616, a file conversion service 620, an application and media information service 618, and a remote data storage service 648. It is noted that not all embodiments described herein include the services described with reference to FIG. 6 and additional services may be provided in addition to or as an alternative to services explicitly described herein. As described herein, each of the services may include one or more web service interfaces that enable the computing device 612 to submit appropriately configured API calls to the various services through web service requests. In addition, each of the services may include one or more service interfaces that enable the services to access each other (e.g., to enable a file conversion service 620 to store data in or retrieve data from the remote data storage service 648).

The inter-process communication service 616 may be a collection of computing resources configured to provide an application of the computing device 612 access to state information of at least one other application of the computing device 612 on behalf of the user. The computing device 612 may interact with the inter-process communication service 616 (via appropriately configured and authenticated API calls) to provide data objects to the computing resource service provider 602 and obtain from the computing resource service provider 602 data objects or links to data objects. The inter-process communication service 616 may receive from the computing device a set of export file type definitions for applications implemented by the computing device 612 as described above. Furthermore, the inter-process communication service 616 may provide an application with the set of export file type definitions enabling the application to determine a set of data objects that the application may interact with.

The file conversion service 620 may be a collection of computing resources configured to provide an application of the computing device 612 or other computing device access to data objects converted to a file format or data object type the application can interact with. The computing device 612 may interact with the file conversion service 620 (via appropriately configured and authenticated API calls) to cause the file conversion service 620 to convert a provided data object to a different data object type. The file conversion service 620 may also obtain data objects from the remote data storage service 648 for conversion. For example, the inter-process communication service 616 may transmit a command to the file conversion service 620 configured to cause the file conversion service to obtain a data object from the remote data storage service 648 and convert the data object to a different data object type. The converted data object may then be provided to the computing device 612 or stored in the remote data storage service.

The application and media information service 618 may be a collection of computing resources configured to provide information corresponding to applications and data object types that may be interacted with by a particular user and/or computing device. The computing device 612 may interact with the application and media information service 618 (via appropriately configured and authenticated API calls) to determine a data object type that a recipient may interact with based at least in part on a set of export file type definitions maintained by the application and media information service 618. For example, an application of the computing device 612 may receive, from a user, a recipient for a message generated by the application, where the message includes a data object to be provided to the recipient.

The application may provide a request to the application and media information service 618 to determine data object type the recipient is capable of interacting with. Furthermore, the application and media information service 618 may maintain an association between data objects and converted data objects. The user of the computing device 612 may also register particular data object types the user is willing to accept. If the application and media information service 618 does not have information corresponding to a particular user, the application and media information service 618 may provide a default data object format.

The computing resource service provider 602 further includes a remote data storage service 648. The remote data storage service 648 may be a collection of computing resources configured to synchronously process requests to store and/or access data. The remote data storage service 648 may operate using computing resources (e.g., databases) that enable the remote data storage service 648 to locate and retrieve data quickly, to allow data to be provided in responses to requests for the data. For example, the remote data storage service 648 may maintain stored data in a manner such that, when a request for a data object is retrieved, the data object can be provided (or streaming of the data object can be initiated) in a response to the request. As noted, data stored in the remote data storage service 648 may be organized into data objects. The data objects may have arbitrary sizes except, perhaps, for certain constraints on size. Thus, the remote data storage service 648 may store numerous data objects of varying sizes. The remote data storage service 648 may operate as a key value store that associates data objects with identifiers of the data objects that may be used by the computing device 612 to retrieve or perform other operations in connection with the data objects stored by the remote data storage service 648. In various embodiments, the remote data storage service 648 may maintain metadata associated with data objects stored by the remote data storage service 648. For example, the metadata may indicate a converted data object generated by the file conversion service 620.

The computing device 612 may be operating in accordance with a corresponding operating system such as a version of an Android® operating system, a Windows® phone operating system or an Apple® iOS operating system, although the techniques of the present disclosure are not limited to those operating systems discussed explicitly herein. The computing device 612 may be the computing device described below in connection with FIG. 9, or may be a computing device incorporating components of the device described above in connection with FIG. 9. For example, the computing device 612 may be a smartphone, tablet, notebook computer, desktop computer, or other computer system, although the techniques described in connection with FIG. 6 are not limited to such devices. Additionally, the operating system of the computing device 612 may be configured to provide applications implemented by the computing device 612 access to data object shared by other applications.

Figure 7:
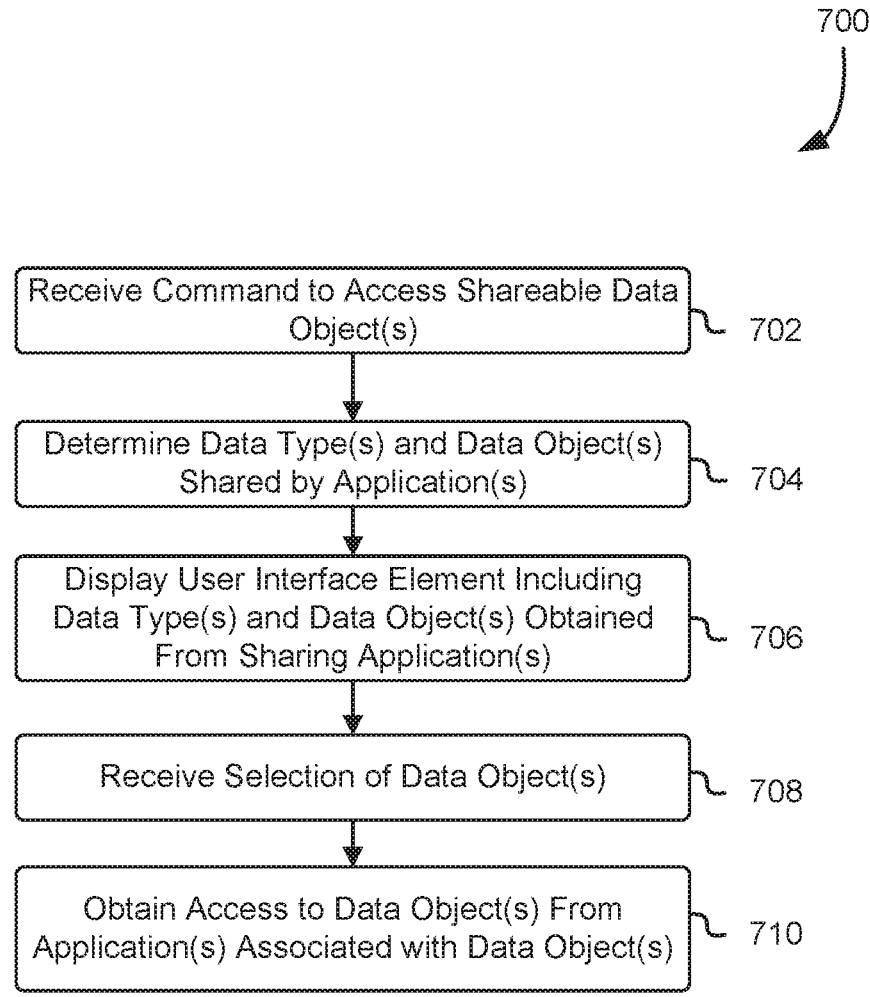
FIG. 7 illustrates an example process for sharing a data object between applications of a mobile computing device using secure inter-process communications in accordance with an embodiment.

FIG. 7 shows an illustrative example of the process 700 which may be used, by an application to obtain access to a data object maintained by another application using a secure inter-process communication channel. The process 700 may be performed by any suitable system, such as the computing device described above in connection with FIG. 6. Returning to FIG. 7, in an embodiment, the process 700 includes receiving a command to access a shareable data object 702. For example, the user may select an attach file button of a user interface element as described above. Selection of the attach file button may cause the application to determine at least one other application for data object types and data objects shared by the at least one other application 704. As described above, the operating system may maintain a set of export file type definitions comprising information corresponding to data object types and data objects shared by various applications implemented by the computer system. The application may request from the operating system information corresponding to a particular data object type, such as a list of all the data objects of the particular data object type that is shared by other applications.

The application may generate a user interface element configured to display data object types and data objects obtained from polling the operating system and/or other applications 706. For example, as illustrated above in FIG. 2, the user interface element may display the data object types in various tabs and display all of the data objects shared with the application of that data object type indicated in the various tabs. The application may receive, through the user interface element, a selection of a data object for sharing 708. Sharing may include providing an application of the computing device or application of a recipient computing device the ability to interact with the data object. For example, the selection of the data object for sharing may include attaching the data object to an e-mail to be delivered to a recipient. The application responsible for generating the user interface element may then obtain access to the data object from an application associated with the data object 710. The export file type definition or information maintained by the operating system may indicate the application associated with the data object. The application associated with the data object may then execute a background thread configured to provide access to the data object. As described above, the application associated with the data object may serialize or marshal the data object to the application.

Figure 8:
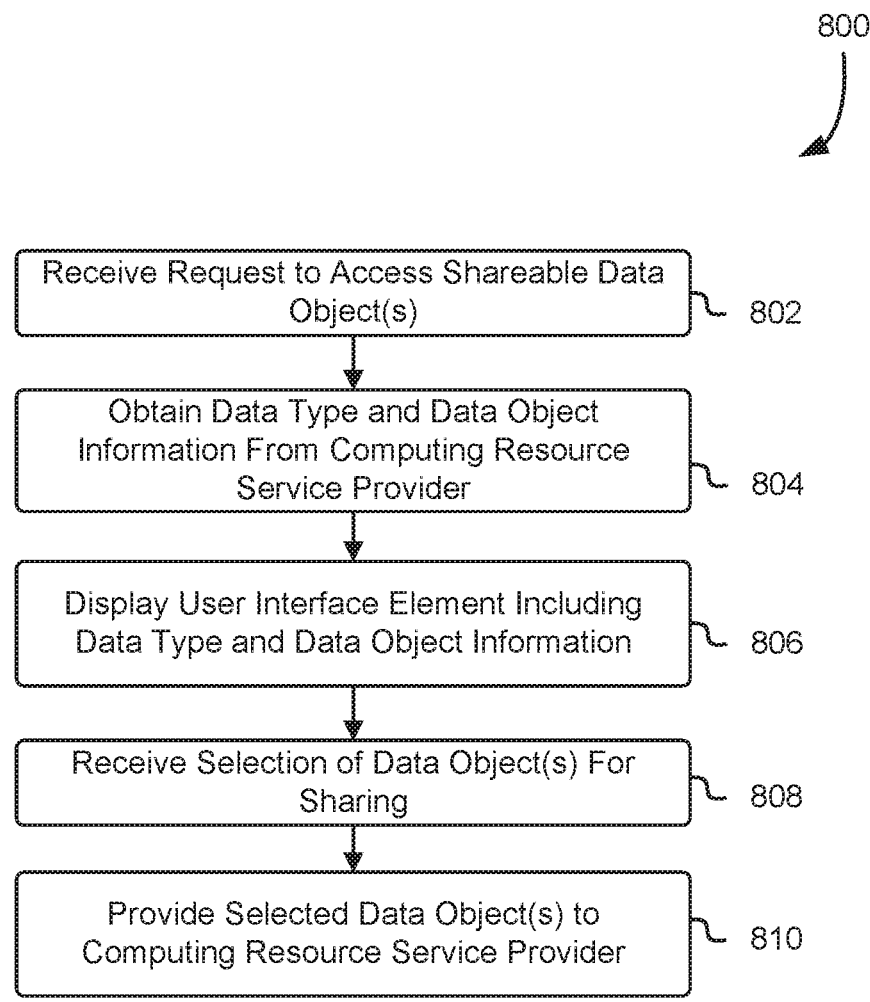
FIG. 8 illustrates an example process for sharing data objects between applications of a mobile device using computing resources of a computing resources service provider in accordance with an embodiment.

FIG. 8 shows an illustrative example of the process 800 which may be used, by an application, to obtain access to a data object maintained by another application using a secure inter-process communication channel. The process 800 may be performed by any suitable system, such as the computing resource service provider described above in connection with FIG. 6. Returning to FIG. 8, in an embodiment, the process 800 includes receiving a command to access a shareable data object 802. For example, the user may select an attach file button of a user interface element as described above. Selection of the attach file button may cause the application to obtain information corresponding to data object types and data objects shared by the at least one other application from the computing resource service provider 804. As described above, the operating system may maintain a set of export file type definitions comprising information corresponding to data object types and data objects shared by various applications implemented by the computer system. The information obtained by the operating system may be provided to the computing resource service provider as described above. The application may request from the computing resource service information corresponding to a particular data object type, such as a list of all the data objects of the particular data object type that is shared by other applications and/or other users. Furthermore, the computing resource service provider may indicate data object types that a recipient may be capable of interacting with.

The application may generate a user interface element configured to display data object types and data objects obtained from the computing resource service provider 806. For example, as illustrated above in FIG. 2, the user interface element may display the data object types in various tabs and display all of the data objects shared with the application of that data object type indicated in the various tabs. The application may receive, through the user interface element, a selection of a data object for sharing 808. For example, the selection of the data object for sharing may include attaching the data object to an e-mail to be delivered to a recipient.

The computing device may then provide the selected data object to the computing resource service provider 810. For example, the computing device may provide a data object to a remote storage service of the computing resource service provider. A link to a storage location of the data object within the remote data storage service may be provided to the recipient or another application of the computing device.

Figure 9:
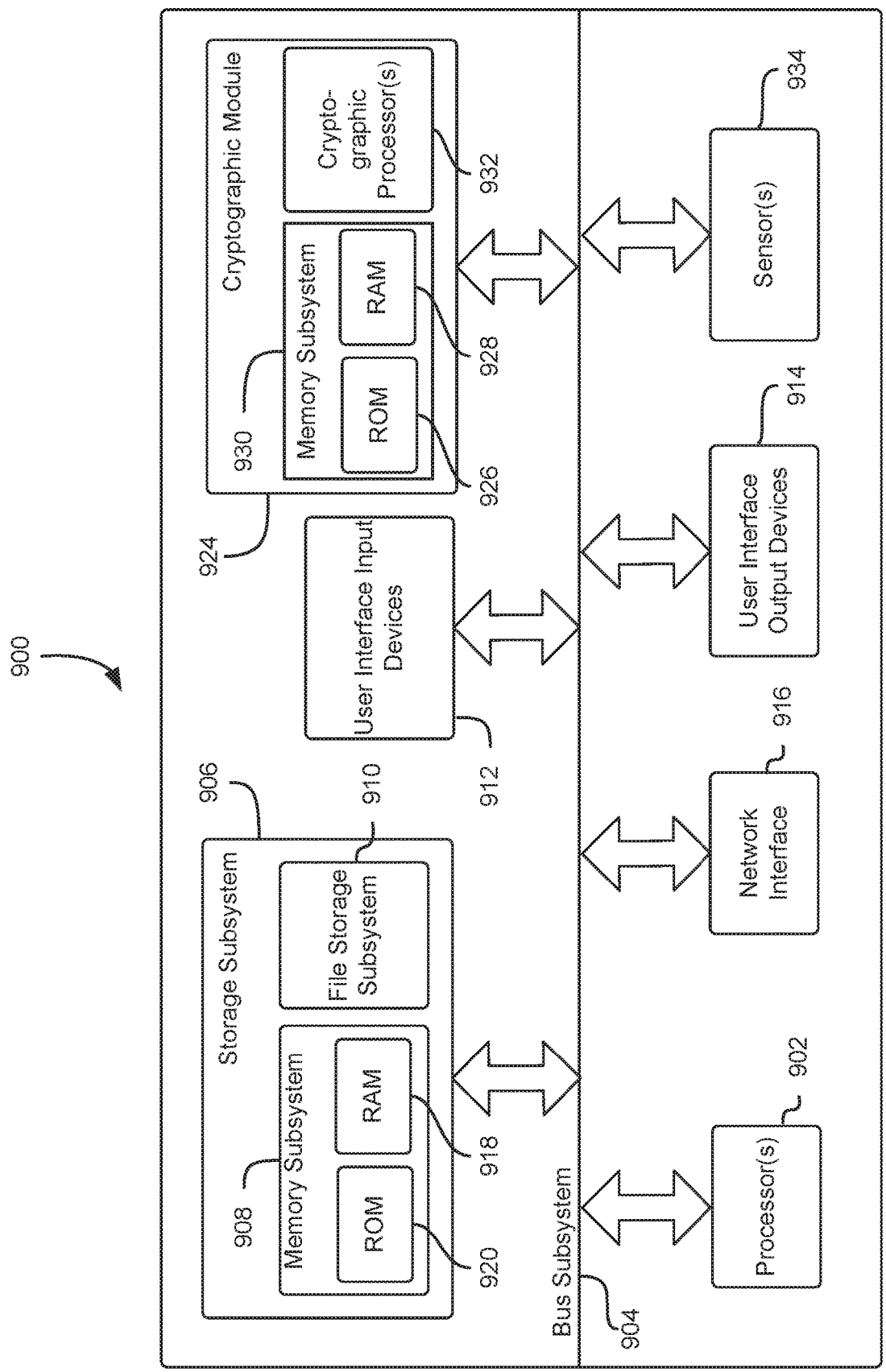
FIG. 9 shows an illustrative example of components of a computing device in accordance with an embodiment.

FIG. 9 is an illustrative, simplified block diagram of an example device system 900 that may be used to practice at least one embodiment of the present disclosure. In various embodiments, the device system 900 may be used to implement any of the systems illustrated herein and described above. For example, the device system 900 may be used to implement a secure inter-process communication channel in accordance with various embodiments. As shown in FIG. 9, the device 900 may include one or more processors 902 that may be configured to communicate with and are operatively coupled to a number of peripheral subsystems via a bus subsystem 904. These peripheral subsystems may include a storage subsystem 906, comprising a memory subsystem 908 and a file storage subsystem 910, one or more user interface input devices 912, one or more user interface output devices 914, a network interface subsystem 916, a cryptographic module 924, comprising a memory subsystem 930, and one or more cryptographic processors 932. The peripheral subsystems may also include one or more sensors 934 in addition to sensors of input devices 912. Such sensors may include, but are not limited to, GPS sensors, accelerometers, temperature sensors, and others.

The bus subsystem 904 may provide a mechanism for enabling the various components and subsystems of device system 900 to communicate with each other as intended. Although the bus subsystem 904 is shown schematically as a single bus, alternative embodiments of the bus subsystem may utilize multiple busses.

The network interface subsystem 916 may provide an interface to other device systems and networks. The network interface subsystem 916 may serve as an interface for receiving data from and transmitting data to other systems from the device system 900. For example, the network interface subsystem 916 may enable transmission of data objects and other information, such as electronic requests to access a system (e.g., receive a webpage) and may enable receipt of responses to the requests, such as webpages or other information. The network interface subsystem 916 may also facilitate the receipt and/or transmission of data on other networks, such as an organization's intranet and/or other networks described below.

The user interface input devices 912 may include one or more buttons, a keyboard, keypad, pointing devices, such as an integrated mouse, trackball, touchpad, or graphics tablet, a scanner, a barcode scanner, a fingerprint scanner, a retinal scanner, a touchscreen incorporated into a display, audio input devices, such as voice recognition systems, microphones, fingerprint readers, retinal scanners, and other types of input devices. Further, in some embodiments, input devices may include devices usable to obtain information from other devices, such as long-term or short-term credentials for use in communicating with the computing resource service provider, as described above. Input devices may include, for instance, magnetic or other card readers, one or more USB interfaces, near field communications (NFC) devices/interfaces, and other devices/interfaces usable to obtain data (e.g., long-term or short-term credentials) from other devices. In general, use of the term "input device" is intended to include all possible types of devices and mechanisms for inputting information to the device system 900.

User interface output devices 914, if any, may include a display subsystem, a printer or non-visual displays, such as audio and/or tactile output devices, etc. Generally, the output devices 914 may invoke one or more of any of the five senses of a user. The display subsystem may be a cathode ray tube (CRT), a flat-panel device, such as a liquid crystal display (LCD), light emitting diode (LED) display, or a projection or other display device. In general, use of the term "output device" is intended to include all possible types of devices and mechanisms for outputting information from the device system 900. The output device(s) 914 may be used, for example, to present user interfaces to facilitate user interaction with applications performing processes described herein and variations therein, when such interaction may be appropriate. While a device 900 with user interface output devices is used for the purpose of illustration, it should be noted that the device 900 may operate without an output device, such as when the device 900 is operated in a server rack and, during typical operation, an output device is not needed.

The storage subsystem 906 may provide a computer-readable storage medium for storing the basic programming and data constructs that may provide the functionality of at least one embodiment of the present disclosure. The applications (programs, code modules (i.e., programming modules), instructions) that, when executed by one or more processors, may provide the functionality of one or more embodiments of the present disclosure, and may be stored in the storage subsystem 906. These application modules or instructions may be executed by the one or more processors 902. The storage subsystem 906 may additionally provide a repository for storing data used in accordance with the present disclosure. The storage subsystem 906 may comprise a memory subsystem 908 and a file/disk storage subsystem 910.

The cryptographic module 924, which may be a trusted platform module (TPM), includes a memory subsystem 930, including a main random access memory (RAM) 928 for storage of instructions and data during program execution and a read only memory (ROM) 926, in which fixed cryptographic information may be stored, such as a hardware secret stored securely within the device 900 so as to be non-exportable (i.e., inaccessible through any call to the cryptographic module 924). The cryptographic module 924, in some embodiments, operates wholly or partly in compliance with Trusted Computing Group's TPM Main Specification level 2, Version 1.2, Revision 116, TPM Main Specification level 2, Version 1.2, Revision 103, and/or ISO/IEC 11888, which are incorporated herein by reference. The device 900 may also store cryptographic keys in RAM 928 and/or processor registers for temporary cryptographic processing. The cryptographic information stored in memory may be used in combination with cryptographic information obtained via the network interface 916 and/or one or more of the user interface input devices 912. The one or more cryptographic processors may be used to perform cryptographic operations in the device and may include a random number generator, SHA-2, or other hash generator and an encryption-decryption-signature engine.

The one or more cryptographic processors may also be configured to perform one or more encryption/decryption algorithms in accordance with one or more cryptographic algorithms, such as public key and/or private key cryptographic algorithms. For example, as discussed, numerous variations utilize symmetric and/or asymmetric cryptographic primitives. Symmetric key algorithms may include various schemes for performing cryptographic operations on data including block ciphers, stream ciphers, and digital signature schemes. Example symmetric key algorithms include, but are not limited to, the advanced encryption standard (AES), the data encryption standard (DES), triple DES (3DES), Serpent, Twofish, blowfish, CAST5, RC4, and the international data encryption algorithm (IDEA). Symmetric key algorithms may also include those used to generate output of one-way functions and include, but are not limited to, algorithms that utilize hash-based message authentication codes (HMACs), message authentication codes (MACs) in general, PBKDF2, and Bcrypt. Asymmetric key algorithms may also include various schemes for performing cryptographic operations on data. Example algorithms include, but are not limited to, those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS #1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme, and the ECQV implicit certificate scheme. Other algorithms and combinations of algorithms are also considered as being within the scope of the present disclosure. Generally, one or more components of the cryptographic module 924 may be configured to collectively perform various operations used for generating cryptographically verifiable information for security tasks.

As noted above, in various embodiments of the present disclosure, hardware secrets are securely stored within the cryptographic module 924. In some embodiments, the cryptographic module is implemented as or may contain a physically unclonable function (PUF), which is a function implemented in physical hardware to use one or more hardware secrets that are based at least in part on physical characteristics of the PUF. As a result, any attempt to obtain a hardware secret may require physical intrusion into the PUF and physical intrusion may alter the physical characteristics of the PUF, thereby destroying the hardware secret. Example PUFs that may be used include PUFs using explicitly-introduced randomness, optical PUFs, coating PUFs, PUFs using intrinsic randomness, delay PUFs, static random access memory (SRAM) PUFs, butterfly PUFs, bistable ring PUFs, magnetic PUFs, metal resistance PUFs, and/or other devices whose physical characteristics encode information usable as or for a hardware secret.

Figure 10:
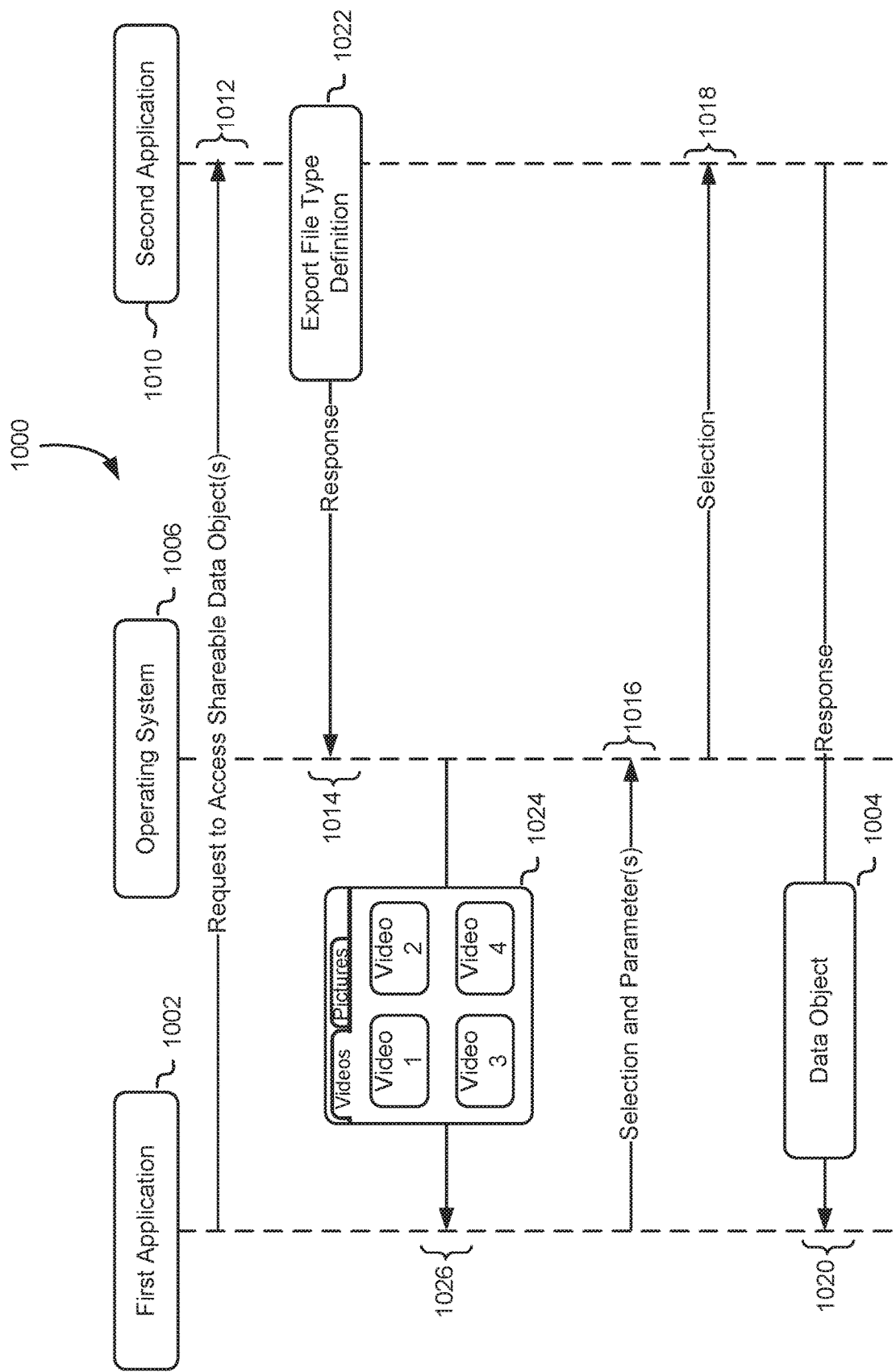
FIG. 10 shows a messaging diagram illustrating secure inter-process communications in accordance with an embodiment.

FIG. 10 illustrates a messaging diagram 1000 where one or more applications implemented by a computing device, as well as the associated code executed thereon, may share a data object utilizing a secure inter-process communication channel in accordance with an embodiment. A first application 1002 may request access to a shareable data object 1012 from a second application 1010. For example as described above, the first application 1002 may attempt to access a set of data objects indicated as shareable by at least one other application, such as the second application 1010, implemented by the computing device. In various embodiments, applications of the computing device may provide export file type definitions to an operation system 1006 of the computing device in order to enable the operating system to facilitate sharing of data objects. In such embodiments, the first application may request access to shareable data objects from the operating system 1006. Returning to FIG. 10, the second application 1010 may then provide the operation system with an export file type definition 1022 in response to the request to access shareable data objects 1014. The export file type definition may indicate a data object type and data object made available to the first application 1002 by the second application 1010 as described above.

The operating system 1006 may then generate a user interface element 1024 configured to enable the user to select a particular shareable data object and provide the generated user interface element 1024 to the user 1026. The user may then select a particular data object from the generated user interface element 1024 and a sharing parameter as described above 1016. For example, the user may select to share a video file and grant the application read only access to the selected video file. The operating system 1006 may manage the first application's 1002 interaction with the particular data object based at least in part on the sharing parameters provided by the user. The selection 1018 of the particular data object may then be provided to the second application 1010. In various embodiments, the sharing parameters may also be provided to the second application 1010 and the second application may modify the particular data object based at least in part on the sharing parameters. For example, the second application may convert the data object to a particular data object type. Furthermore, the second application 1010 may provide the data object 1004 to the first application in response 1020 to receiving the selection 1018 from the first application 1002.

Figure 11:
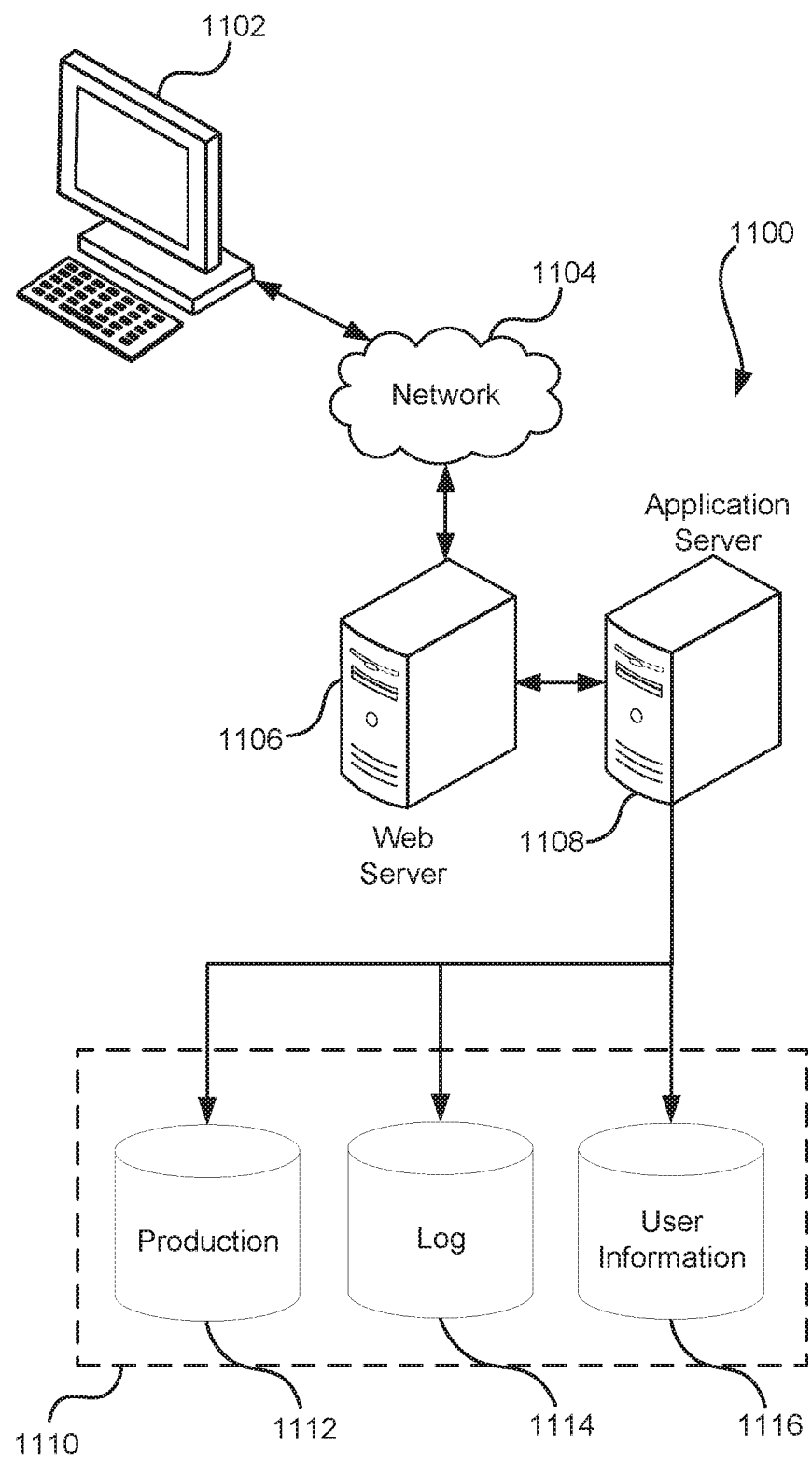
FIG. 11 illustrates an environment in which various embodiments can be implemented.

FIG. 11 illustrates aspects of an example environment 1100 for implementing aspects in accordance with various embodiments. As will be appreciated, although a web-based environment is used for purposes of explanation, different environments may be used, as appropriate, to implement various embodiments. The environment includes an electronic client device 1102, which can include any appropriate device operable to send and/or receive requests, messages or information over an appropriate network 1104 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network, and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment.

The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), or another appropriate client-side structured language. Content transferred to a client device may be processed by the client device to provide the content in one or more forms including, but not limited to, forms that are perceptible to the user audibly, visually, and/or through other senses including touch, taste, and/or smell. The handling of all requests and responses, as well as the delivery of content between the client device 1102 and the application server 1108, can be handled by the web server using PHP: Hypertext Preprocessor ("PHP"), Python, Ruby, Perl, Java, HTML, XML, or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1110 can include several separate data tables, databases, data documents, dynamic data storage schemes, and/or other data storage mechanisms and media for storing data relating to a particular aspect of the present disclosure. For example, the data store illustrated may include mechanisms for storing production data 1112 and user information 1116, which can be used to serve content for the production side. The data store also is shown to include a mechanism for storing log data 1114, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. The application server 1108 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java C, C #, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these, and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices, or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including,"

and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B, and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
    detecting a request to access a set of data objects, the request generated in response to a command received through a user interface of a first application, the set of data objects stored in a memory inaccessible to the first application;
    determining the set of data objects based at least in part on an export file type definition defined at least in part according to an operation of a second application;
    displaying a graphical user interface element to display a data object of the set of data objects within the user interface of the first application, the graphical user interface element enabling selection of the data object;
    receiving, through the graphical user interface element displayed in the user interface of the first application, the selection of the data object; and
    in response to the selection:
        providing, at least by causing the data object to be copied by the second application to a shared directory accessible to the first application and the second application, a copy of the data object obtained from the memory; and
        providing the first application with a reference to the copy of the data object in the shared directory.

2. The computer-implemented method of claim 1, wherein the export file type definition indicates one or more file types of the set of data objects shared by the second application.

3. The computer-implemented method of claim 1, wherein the second application is an extension of the first application and the set of data objects having been generated by the second application.

4. The computer-implemented method of claim 1, wherein a portion of the user interface is generated by the second application.

5. A system, comprising:
    a computing device that executes instructions to:
        receive a request to access a data object associated with a first application of a plurality of applications, the request generated in response to a command received through a user interface of a second application, the data object stored in a memory inaccessible to the second application;
        determine the data object based at least in part on an export file type definition defined at least in part according to an operation of the first application;
        cause a user interface element representing the data object to display within the user interface of the second application, the user interface element enabling selection of the data object;
        receive, via the user interface element, the selection of the data object through the user interface; and
        in response to the selection:
            provide, by at least causing the data object to be copied by the first application to a shared directory accessible to the first application and the second application, a copy of the data object obtained from the memory; and provide the second application with a reference to the copy of the data object in the shared directory.

6. The system of claim 5, wherein the data object associated with the first application is defined by an export file type definition generated based at least in part on an operation of the first application.

7. The system of claim 5, wherein the second application is a messaging application of a plurality of applications executable by the computing device.

8. The system of claim 5, wherein the instructions further include instructions that cause the system to provide the second application with access to the data object by providing the second application with the reference to the data object.

9. The system of claim 8, wherein the reference is a uniform resource locator.

10. A non-transitory computer-readable storage medium comprising executable instructions that, as a result of being executed by one or more processors of a computer system, cause the computer system to:

receive a request to access a data object associated with an application that can be provided to another application, the request generated in response to a command received through a user interface of the other application, the data object stored in a memory inaccessible to the other application;

determine the data object based at least in part on an export file type definition defined at least in part according to an operation of the application;

cause a graphical user interface element representing the data object to display within the user interface of the other application, the graphical user interface element enabling selection of the data object;

receive, via the graphical user interface element, the selection of a data object through a user interface; and in response to the selection:

provide, by at least causing the data object to be copied by the application to a shared directory structure accessible to the application and the other application, a copy of the data object obtained from the memory; and provide the other application with a reference to the copy of the data object in the shared memory.

11. The non-transitory computer-readable storage medium of claim 10, wherein the reference indicates a location of the copy of the data object in the shared memory.

12. The non-transitory computer-readable storage medium of claim 10, wherein the executable instructions further include instructions that cause the computer system to provide the reference to the copy of the data object to the other application.

13. The non-transitory computer-readable storage medium of claim 10, wherein the executable instructions further comprise instructions that, when executed by the one or more processors, cause the computer system to provide the export file type definition to the other application.

14. The non-transitory computer-readable storage medium of claim 13, wherein the executable instructions further comprise instructions that further cause the computer system to generate the user interface based at least in part on the export file type definition.

15. The non-transitory computer-readable storage medium of claim 10, wherein the executable instructions that cause the computer system to cause the data object to be stored in the shared memory further include instructions that further cause the computer system to store the data object in the shared memory as a result of an application program interface call.

16. The non-transitory computer-readable storage medium of claim 10, wherein executable instructions further include instructions that further cause the computer system to generate an export file type definition indicating a set of data objects associated with the application that can be provided to the other application, the set of data objects including the data object.

17. The non-transitory computer-readable storage medium of claim 16, wherein the executable instructions that cause the computer system to generate the export file type definition further include instructions that further cause the computer system to generate the export file type definition in response to a set of commands provided by the application.

18. The non-transitory computer-readable storage medium of claim 16, wherein the executable instructions further comprise instructions that further cause the computer system to determine the set of data objects in response to receiving the export file type definition.

19. The computer-implemented method of claim 1, wherein the export file type definition limits the set of data objects to a set of data types.

20. The computer-implemented method of claim 19, wherein the set of
data types includes one or more of:
video,
audio data, or
image.

* * * * *